United States Patent
Varma

(10) Patent No.: US 9,573,067 B2
(45) Date of Patent: Feb. 21, 2017

(54) MASS STORAGE IN GAMING HANDHELDS

(75) Inventor: Ankur Varma, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1552 days.

(21) Appl. No.: 11/250,897

(22) Filed: Oct. 14, 2005

(65) Prior Publication Data

US 2007/0087796 A1    Apr. 19, 2007

(51) Int. Cl.
| | |
|---|---|
| G06F 12/14 | (2006.01) |
| A63F 13/95 | (2014.01) |
| A63F 13/92 | (2014.01) |
| A63F 13/00 | (2014.01) |

(52) U.S. Cl.
CPC ............ *A63F 13/95* (2014.09); *A63F 13/00* (2013.01); *A63F 13/92* (2014.09); *G06F 12/14* (2013.01); *A63F 2300/204* (2013.01); *A63F 2300/206* (2013.01); *G06F 2221/2141* (2013.01)

(58) Field of Classification Search
USPC ..................................................... 463/43–44
See application file for complete search history.

(56) References Cited

U.S. PATENT DOCUMENTS

| | | | | | |
|---|---|---|---|---|---|
| 4,037,215 | A | * | 7/1977 | Birney et al. ................. | 711/202 |
| 5,095,798 | A | * | 3/1992 | Okada et al. .................. | 463/35 |
| 5,184,830 | A | * | 2/1993 | Okada et al. .................. | 463/29 |
| 5,426,763 | A | * | 6/1995 | Okada ................ | G06F 12/1433 |
| | | | | | 365/195 |
| 5,586,301 | A | * | 12/1996 | Fisherman et al. ........... | 711/152 |
| 5,657,470 | A | * | 8/1997 | Fisherman et al. ........... | 711/153 |
| 5,781,192 | A | * | 7/1998 | Kodimer ........................ | 715/770 |
| 5,825,878 | A | * | 10/1998 | Takahashi et al. ............ | 713/190 |
| 5,991,856 | A | * | 11/1999 | Spilo et al. .................... | 711/147 |
| 6,247,126 | B1 | * | 6/2001 | Beelitz et al. .................... | 713/1 |
| 6,292,874 | B1 | * | 9/2001 | Barnett ......................... | 711/153 |
| 6,315,669 | B1 | * | 11/2001 | Okada et al. ................... | 463/44 |

(Continued)

FOREIGN PATENT DOCUMENTS

WO    WO 2005/055226 A1    6/2005

OTHER PUBLICATIONS

"Will Hard Drives Finally Stop Shrinking?" by Linda Dailey Paulson, from pp. 14-16 of Computer magazine (www.computer.org), May 2005.*

(Continued)

*Primary Examiner* — Steven J Hylinski
(74) *Attorney, Agent, or Firm* — Micah P. Goldsmith; Judy Yee; Micky Minhas

(57) ABSTRACT

A handheld gaming device having a non-removable hard disk drive memory is used to perform gaming and non-gaming functions. The hard disk drive memory provides internal mass storage that is utilizable for storing various types of game-related information and non-game-related information. In one embodiment, the hard disk drive is configured to store selected portions of data in assigned regions of memory. The internal mass storage can be used to store saved game data, game specific data, and can be used as a buffer while streaming content from a remote server or drive. The internal mass storage also can be used to store other types of information, such as calendar information, personal appointments, maps, photographs, and other third party game related information.

17 Claims, 4 Drawing Sheets

(56) References Cited

U.S. PATENT DOCUMENTS

| | | | |
|---|---|---|---|
| 6,336,187 B1* | 1/2002 | Kern et al. | 713/161 |
| 6,478,679 B1* | 11/2002 | Himoto et al. | 463/36 |
| 6,507,904 B1* | 1/2003 | Ellison et al. | 712/229 |
| 6,507,905 B1* | 1/2003 | Hubacher et al. | 713/1 |
| 6,516,466 B1 | 2/2003 | Jackson | 725/62 |
| 6,544,126 B2 | 4/2003 | Sawano et al. | 463/42 |
| 6,626,760 B1* | 9/2003 | Miyamoto et al. | 463/33 |
| 6,716,102 B2* | 4/2004 | Whitten et al. | 463/43 |
| 6,810,463 B2* | 10/2004 | Okada et al. | 711/115 |
| 6,865,049 B1* | 3/2005 | Codilian et al. | 360/71 |
| 6,928,468 B2* | 8/2005 | Leermakers | 709/221 |
| 6,961,858 B2* | 11/2005 | Fransdonk | 726/29 |
| 6,966,837 B1* | 11/2005 | Best | 463/33 |
| 7,010,701 B1* | 3/2006 | Bossemeyer et al. | 711/173 |
| 7,031,973 B2* | 4/2006 | Natarajan et al. | |
| 7,096,004 B2* | 8/2006 | Minear et al. | 455/410 |
| 7,099,663 B2* | 8/2006 | Lundblade et al. | 455/425 |
| 7,137,894 B2* | 11/2006 | Okada et al. | 463/44 |
| 7,229,349 B2* | 6/2007 | Yamada | 463/9 |
| 7,343,568 B2* | 3/2008 | Jiang et al. | 715/854 |
| 7,445,549 B1* | 11/2008 | Best | 463/32 |
| 7,472,138 B2* | 12/2008 | Adkins et al. | 707/202 |
| 7,502,946 B2* | 3/2009 | Perkins et al. | 713/193 |
| 7,536,172 B2* | 5/2009 | Minear et al. | 455/410 |
| 7,792,121 B2* | 9/2010 | Thompson et al. | 370/395.4 |
| 7,811,174 B2* | 10/2010 | Whitten | A63F 13/10 |
| | | | 463/30 |
| 7,844,579 B2* | 11/2010 | Peterson et al. | 707/661 |
| 2001/0039212 A1* | 11/2001 | Sawano et al. | 463/43 |
| 2002/0046216 A1* | 4/2002 | Yamazaki et al. | 707/201 |
| 2002/0142845 A1* | 10/2002 | Randall Whitten et al. | 463/43 |
| 2003/0190952 A1* | 10/2003 | Smith | A63F 13/12 |
| | | | 463/30 |
| 2004/0082361 A1* | 4/2004 | Rajagopalan | 455/556.1 |
| 2004/0233930 A1 | 11/2004 | Colby, Jr. | 370/464 |
| 2004/0242325 A1 | 12/2004 | Levitan et al. | 463/41 |
| 2004/0259642 A1* | 12/2004 | Tanaka et al. | 463/42 |
| 2005/0039995 A1* | 2/2005 | Inoke et al. | 188/371 |
| 2005/0086501 A1* | 4/2005 | Woo et al. | 713/189 |
| 2005/0119053 A1* | 6/2005 | Suzuki et al. | 463/42 |
| 2005/0120380 A1* | 6/2005 | Wolfe | 725/100 |
| 2005/0138296 A1* | 6/2005 | Coulson et al. | 711/141 |
| 2006/0148510 A1* | 7/2006 | Zhang | 455/550.1 |
| 2006/0277218 A1* | 12/2006 | Franco et al. | 707/200 |
| 2006/0277311 A1* | 12/2006 | Franco et al. | 709/229 |

OTHER PUBLICATIONS

"Toshiba Readies Truly Tiny Hard Drive," by Martyn Williams, IDG News Service, published Thursday, Jan. 8, 2004.*

"Start-up brings hard drive to the masses," by Michael Kanellos, CNET News, published Jun. 3, 2003.*

Apple-iPod, iPod Which iPod are you?, iPodU2, http://www.apple.com/ipod/u2/mucisandmore.html, 2005, 2 pages.

N-Gage Nokia, N-Gage QD Game Deck/Gaming/Multiplayer Phone Games, http://web.n.gage.com/en-R1/gamedeck/ngage_qd/gaming, 2005, 2 pages.

Xbox Video Game System, http://www.xbox.com/en-US/hardware/xbox.htm, 2005, 2 pages.

Playstation, http://www.us.playstation.com/psp.aspx?id=overview, Home Page, 2005, 2 pages.

* cited by examiner

MASS STORAGE IN GAMING HANDHELDS

TECHNICAL FIELD

The technical field relates generally to gaming systems and more specifically to hand held gaming devices.

BACKGROUND

Currently available handheld gaming devices have limited internal data storage capacity. Typically, the internal data storage of a handheld gaming device is used to store system and configuration information. Other information, such as saved game data and game-specific data is often stored on a memory device that is external to the handheld game device. Existing handheld gaming devices do not contain an internal mass storage capability.

SUMMARY

A handheld gaming device includes a non-removable hard disk drive memory. The hard disk drive memory provides to the handheld gaming device internal mass storage that is utilizable for storing various types of game-related information and non-game-related information. The internal mass storage can be used to store saved game data, game specific data, and can be used as a buffer while streaming content from a remote server or drive. The internal mass storage also can be used to store other types of information, such as calendar information, personal appointments, maps, photographs, and other third party game related information.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

Figure 1:
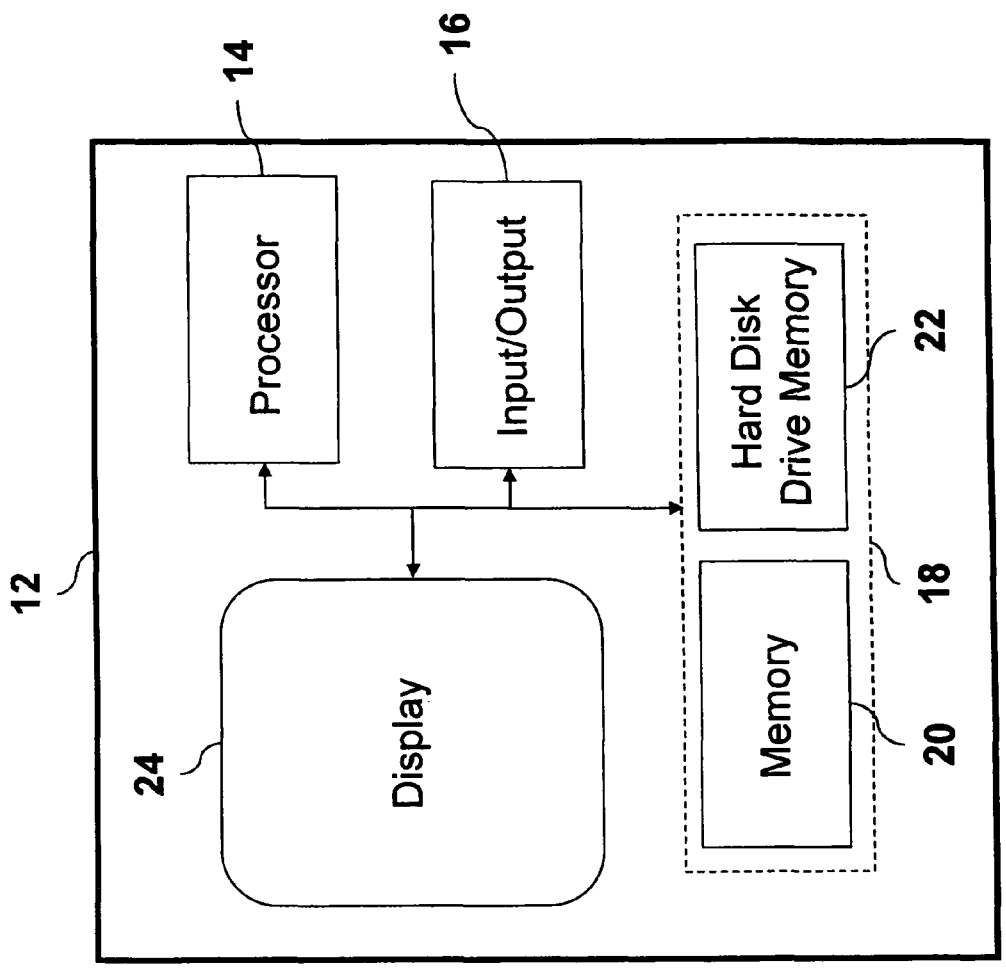
FIG. 1 is a diagram of an exemplary handheld gaming device comprising a hard disk drive memory.

FIG. 1 is a diagram of an exemplary handheld gaming device comprising a hard disk drive memory. The handheld gaming device 12 comprises a processor portion 14, an input/output portion 16, a memory portion 18, and a display portion 24. The handheld gaming device 12 can include any appropriate handheld gaming device such as a dedicated handheld gaming device, a personnel digital assistant (PDA), a cell phone, a mobile phone, a smart phone, or a combination thereof, for example. The processor portion 14 performs various functions for the handheld gaming device 12. The processor portion 14 facilitates processing of information to be rendered via the display portion 24. Video information also can be rendered via an external peripheral (e.g., display monitor) via the input/output portion 16. The processor portion processes audio information. Audio information can be rendered via a transducer (e.g., speaker) of the handheld gaming device 12 (audio transducer not shown in FIG. 1), or can be rendered by an external device via the input/output portion 16.

The processor portion 14 also facilitates access to the main memory portion 18. The main memory portion 18 comprises a memory portion 20 and at least one non-removable hard disk drive memory portion 22. The memory portion 20 can comprise any appropriate type of memory such as flash ROM (Read Only Memory), RAM (Random Access Memory), volatile memory, non-volatile memory, semiconductor memory, magnetic memory, or a combination thereof for example. The hard disk drive memory 22 can comprise any appropriate memory implemented on a hard disk drive. Examples of appropriate hard disk drive memory 22 include the following commercially available products: a 0.85 inch hard disk drive memory, a 1 inch hard disk drive memory, a 1.8 inch hard disk drive memory, a 2.5 inch hard disk drive memory, and a 3.5 inch hard disk drive memory. The input/output portion 16 is capable of providing coupling to any appropriate peripheral and/or network such as a game controller, a display monitor, an audio speaker, a processor, another gaming component, the Internet, or a combination thereof, for example. The input/output portion 16 also can comprise Universal Serial Bus (USB) compatible port. Appropriate peripherals can be coupled to the USB compatible ports. For example, additional memory, such as USB compatible flash memory, can be coupled to the handheld gaming device 12 via the input/output portion 16.

Figure 2:
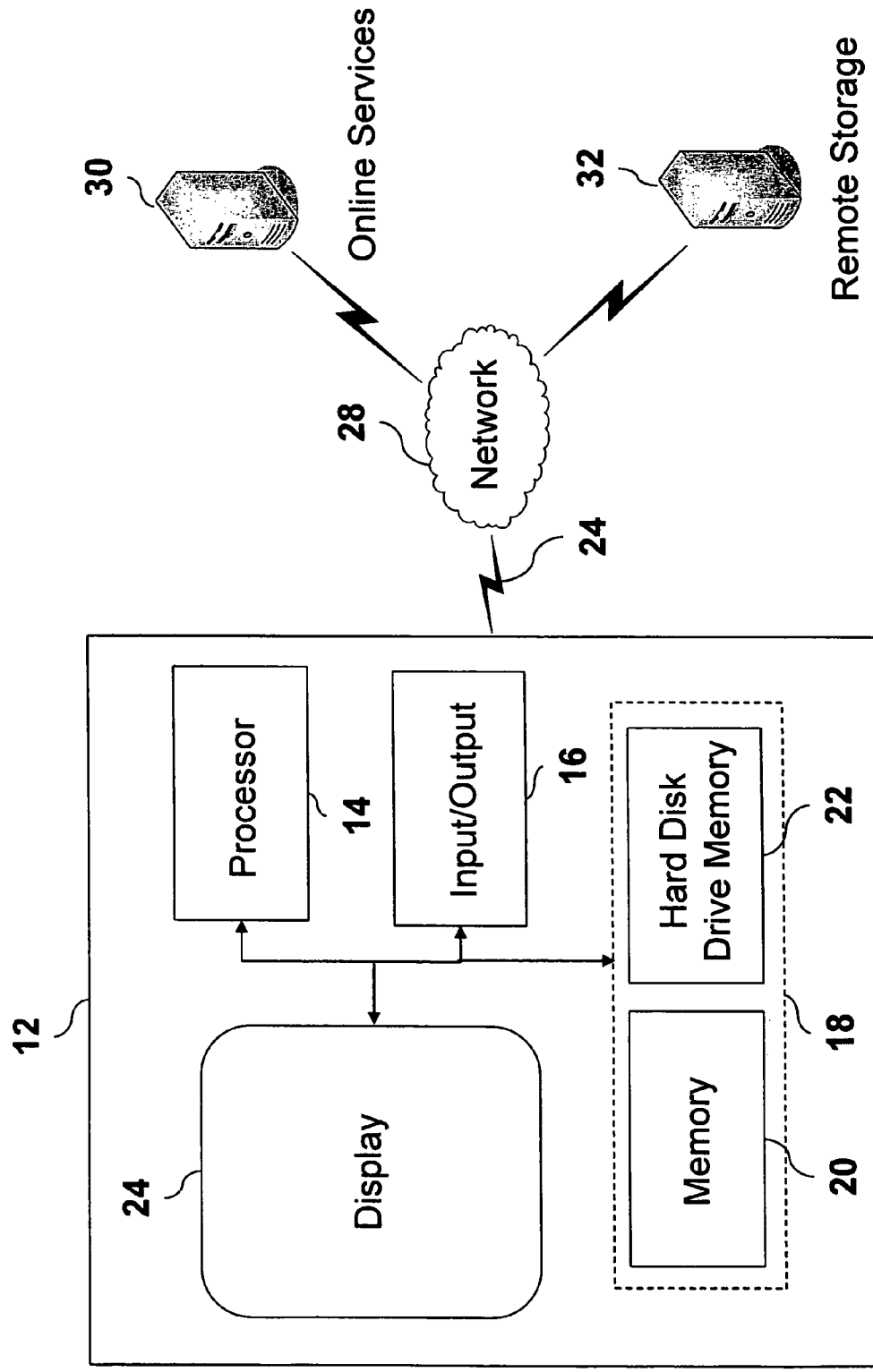
FIG. 2 is a diagram of an exemplary configuration of the handheld gaming device comprising a hard disk drive memory coupled to a network.

FIG. 2 is a diagram of an exemplary configuration of the handheld gaming device 12 having a non-removable hard disk drive memory 22 coupled to a network 28. The network 28 is coupled to the handheld gaming device 12 via interface 24. The interface 24 can comprise a wireless interface, a hard-wired interface, or a combination thereof. The network 28 represents any of a wide variety of data communications networks. The network 28 can include public portions (e.g., the Internet) as well as private portions (e.g., a residential Local Area Network (LAN)), or a combination thereof. The network 28 can be implemented using any one or more of a wide variety of conventional communications media including both wired and wireless media. Any of a wide variety of communications protocols can be used to communicate data via the network 28, including both public and proprietary protocols. Examples protocols include TCPIIP, IPXI SPX, and NetBEUI.

The handheld gaming device 12 comprising a non-removable hard disk drive 22 can be coupled to any of a variety of entities via the network 28. For example, the handheld gaming device 12 can be coupled to at least one online service 30 and/or at least one remote storage facility 32. The online services 30 can provide various services, such as hosting online games, serving downloadable music or video files, hosting gaming competitions, serving streaming audio/video files, and the like for example. Online storage 32 also can be provided via the network 28. Thus, in addition to the memory portion 20, the hard disk drive memory 22, and memory devices coupled to the handheld device 12 via the input/output portion 16, the handheld gaming device 12 also can access data files available at remote storage locations 32 via the network 28. In an exemplary embodiment, the hard disk drive memory 22 is used as a buffer for streaming data from the network 28 to the handheld gaming device 12.

The addition of the hard disk drive memory 22 to the handheld gaming device 12 significantly increases the amount of data that can be stored within the handheld gaming device 12. Increasing the amount of memory in the handheld gaming device allows more functions to be performed. In an exemplary embodiment, the handheld gaming device can utilize the hard disk drive memory to perform functions associated with PDAs and digital diaries. For example, the hard disk drive memory of the handheld gaming device can be used to store calendar information, personal appointments, an address, an instant message, an email message, a map, a photographic image, or the like. To facilitate processing and storage of the increased amount of data, the hard disk drive memory 22 can be separated into regions for storing different types of data. In an exemplary embodiment, the hard disk drive of the handheld gaming device can be used to buffer streaming data, such as streaming video data, streaming audio data, streaming multimedia data, or a combination thereof.

Figure 3:
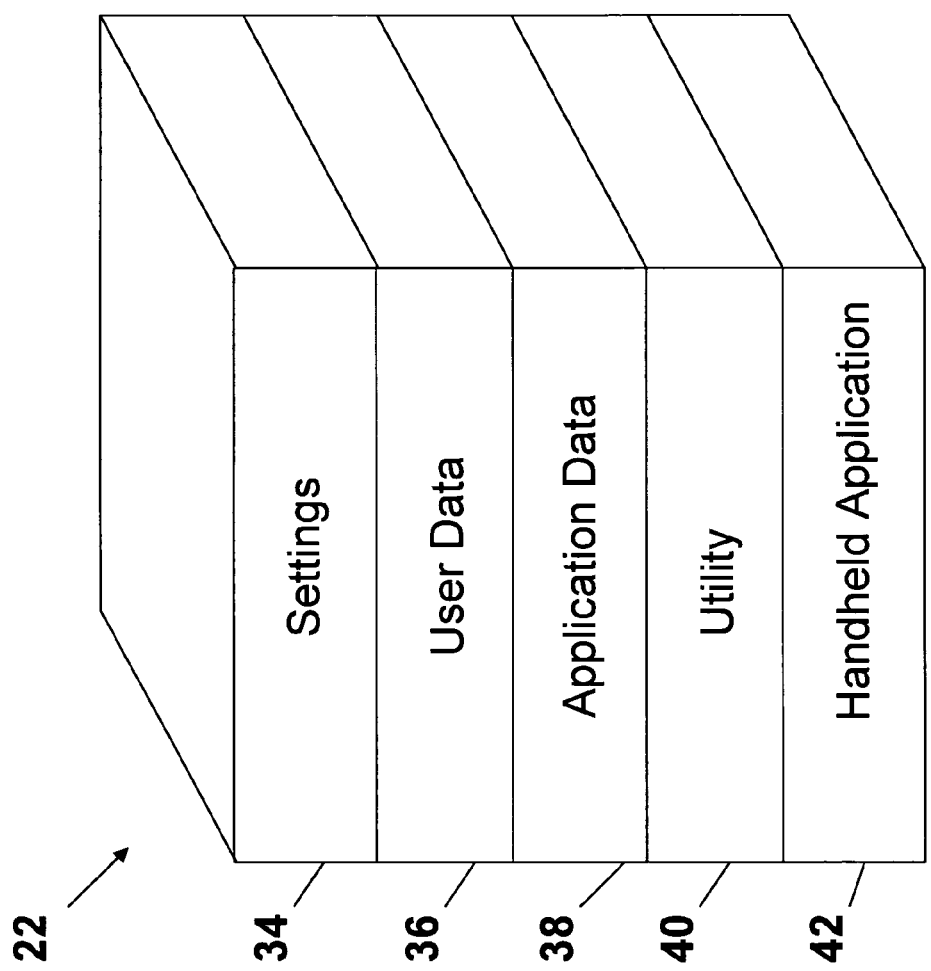
FIG. 3 is a diagram depicting an exemplary configuration of the hard disk drive memory separated into storage areas.

FIG. 3 is a diagram depicting an exemplary configuration of the hard disk drive memory 22 separated into five regions, or storage areas: a settings region 34, a user data region 36, an application data region 38, a utility region 40, and a handheld application region 42. It is emphasized that the separation of the hard disk drive memory 22 into five regions as depicted in FIG. 3 is exemplary and the configuration and utilization of the hard disk drive memory 22 should not be limited thereto. The hard disk drive memory 22 can contain any number of regions. Each region is designated to store a particular type of data and has specific data access policies that restrict data access to those applications that are intended to access that type of data. The five regions represent a logical segregation of the hard disk drive and do not necessarily correspond to physical divisions or physical partitions of the hard disk drive. One or more applications (e.g., a handheld application) executed by the handheld gaming device maintain and support this logical segregation of the hard disk drive into multiple regions.

The settings region 34 is used to store handheld gaming device state and configuration information. Third-party applications (such as game applications, music applications and movie applications) are denied direct access to the settings region 34. In an exemplary embodiment, data stored in the settings region 34 is requested via API (application program interface) calls. In an exemplary embodiment, the settings region 34 is protected to ensure that the settings data is not corrupted and, if necessary, can survive a complete handheld gaming device restoration procedure.

The user data region 36 is used to store user data on the handheld gaming device. User data can include, for example, game data saved by a user of the handheld gaming device, picture files saved by a user, or a combination thereof. In addition to storing user data in the user data region 36 of the hard disk drive memory 22, user data also can be stored in the memory portion 20, a memory device coupled to the handheld gaming device 12 via the input/output portion 16, remote storage 32, or a combination thereof. In an exemplary embodiment, the user data region 36 can be used to store calendar information, personal appointments, an address, an instant message, an email message, a map, a photographic image, or the like.

The application data region 38 is used to store persistent data used by various applications that are executed on the handheld gaming device. The data stored in the application data region 38 are created at various times during the execution of the application. This data is typically stored without the user's knowledge. The data stored in the application data region 38 allows the application to maintain data across multiple game sessions without requiring the data to be associated with a particular saved game. In an exemplary embodiment, music files (e.g., WMA files) are saved in the application data region 38. Other exemplary data storable in the application data region 38 include updated player rosters, game updates, new game levels, skid marks on a road, damage to a building or object, or other changes that are maintained by the application. In an exemplary embodiment, each application is provided with a separate storage area (e.g., subdirectory) within the application data region 38 to store its application data.

In an exemplary embodiment, to mitigate problems associated with limited storage space allocated to each application, the memory boundaries of a region are not fixed. In an exemplary implementation, the user data 36 and the application data 38 are stored in a single partition of the hard disk drive memory 22. This allows each application to use any portion of the data storage capacity provided by the partition. Each application uses a portion of the overall storage capacity of the partition. In this implementation, applications are not restricted to using a particular portion of the partition's total storage capacity. This configuration provides flexibility to the application (and the application developer) by allowing the application to use the amount of storage space desired. This configuration also reduces problems caused by limiting storage space allocated to each application.

In an exemplary embodiment, each region of the hard disk drive memory can be further segregated into different sections or storage areas (e.g., subdirectories) that are associated with a particular application. This further segregation ensures that data associated with a particular application is not accessed or modified by another application, thereby maintaining the integrity of the data associated with each application that is executed by the handheld gaming device. For example, the user data region 36 can be separated into user data sub-regions, each user data sub-region being assigned to a different application. Similarly, the application data region 38 can be separated into application data sub-regions, each application data sub-region being assigned to a different application.

The utility region 40 is used to store any data by the application. The utility region 40 can be used in any way by the application. The handheld gaming device imposes no restrictions on the use of the utility region 40 by the application. Thus, each application is able to use its assigned utility region 40 in any manner that the application developer desires. Applications can use utility region 40 for caching data or creating a virtual memory space. The utility region 40 is for temporary storage of data. In an exemplary embodiment, the utility region 40 is used to buffer streaming data. In an exemplary embodiment the utility region 40 is used to store information such as calendar information, personal appointments, an address, an instant message, an email message, a map, a photographic image, or the like Thus, the handheld gaming device can be used to perform non-game functions, such as functions associated with PDAs and digital diaries, for example. In an exemplary embodiment, the utility region 40 can be used to store calendar information, personal appointments, an address, an instant message, an email message, a map, a photographic image, or the like.

The handheld application region 42 is used to store various data used during execution of the handheld application, such as user interface data. Other applications are prevented from accessing the data stored in the handheld application region 42. In an exemplary embodiment, the handheld application region 42 is stored in a separate partition of the hard disk drive memory 22 to reduce the likelihood that data stored in the console application region would become corrupted.

Figure 4:
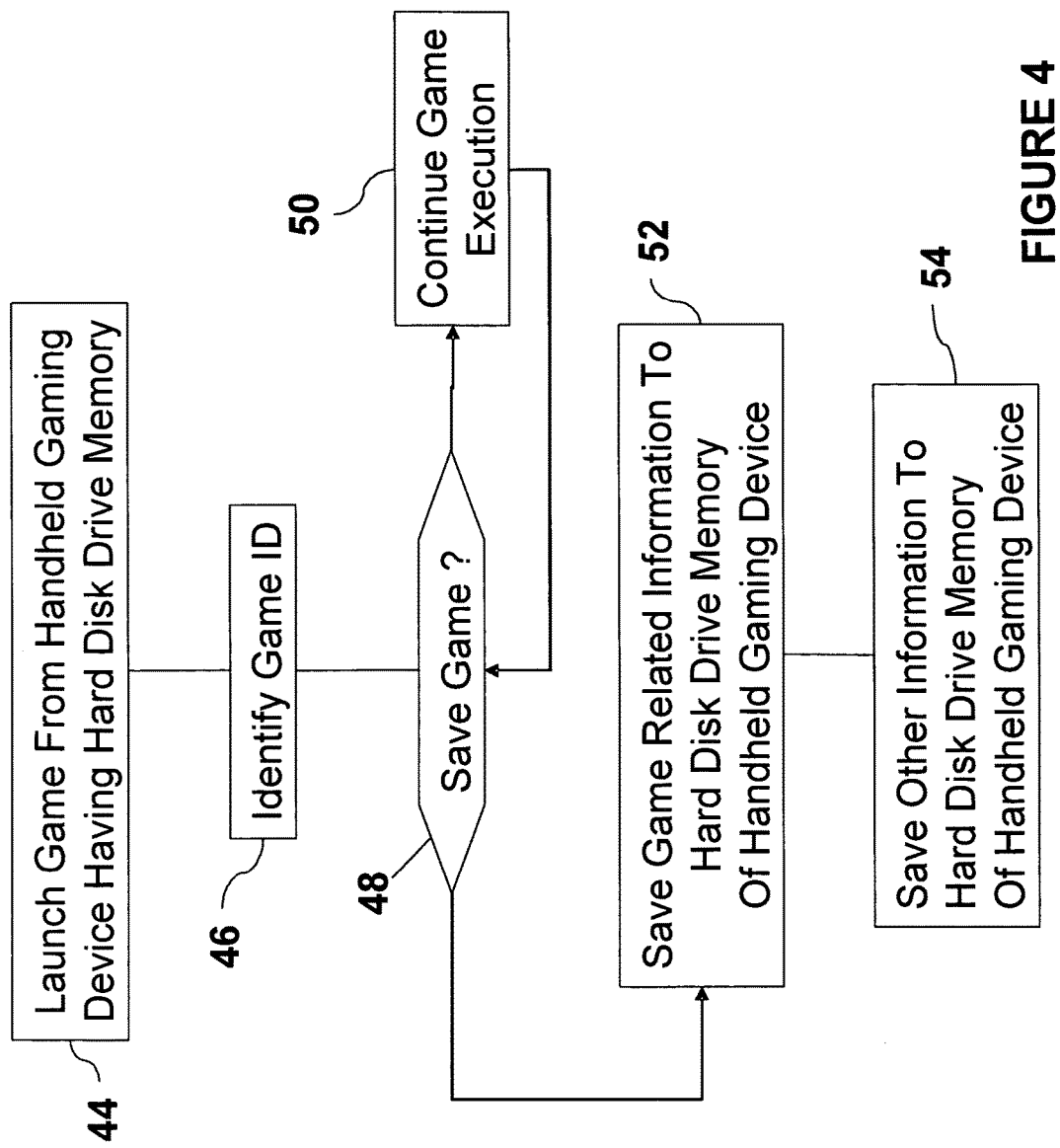
FIG. 4 is a flow diagram of an exemplary process for storing information in a hard disk drive memory of a handheld gaming device.

FIG. 4 is a flow diagram of an exemplary process for storing information in a hard disk drive memory of a handheld gaming device. The process depicted in FIG. 4 is computer implementable in the form of software as computer-executable instructions. A game is launched from the handheld gaming device at step 44. A game can be launched by inserting memory, such as portable flash memory, into the handheld gaming device 12 via the input/output portion 16, by selecting a game (or a saved game) from the hard disk drive memory 22, by selecting a game (or a saved game) from the memory portion 20, by selecting a game from an online source such as online service 30, by selecting a game (or a saved game) from remote storage such as remote storage 32, or a combination thereof. A game ID associated with the launched game is identified at step 46. The game ID is used by the handheld gaming device to distinguish one game from another and ensure that different games access the appropriate sets of data from the hard disk drive memory 22.

In an exemplary embodiment, pointers are created to identify the appropriate regions of the hard disk drive memory based on the game ID. For example, a particular game can be permitted to access a particular portion of the user data region 36 of the hard disk drive memory 22 and a particular portion of the application data region 38 of the hard disk drive memory 22. The pointers can direct the application to the appropriate portions of the user data region 36 and the application data region 38, and not allow access to portions of the user data region 36 and the application data region 38 that are associated with different games. In an exemplary embodiment, a particular pointer can identify particular subdirectories on the hard disk drive memory, as described above. At step 48 it is determined if a user of the handheld gaming device has requested that the current game be saved on the hard disk drive memory 22. If the user has not requested (step 48) to save the current game, execution of the game continues at step 50. If the user has requested (step 48) that the current game be saved, game related information is saved to the hard disk drive of the handheld gaming device at step 52. Game related information can include any appropriate game related information as described above, for example the current state of the game. Also as described above, game related information can be stored in appropriate regions of the hard disk drive memory of the handheld gaming device. Other information is stored in the hard disk drive memory of the handheld gaming device at step 54. Other information can include calendar information, personal appointments, an address, an instant message, an email message, a map, a photographic image, or the like. In an exemplary embodiment, other information can be stored at any time, either during execution of a game or during non-execution of a game.

As described above, while exemplary embodiments of a handheld gaming device comprising a non-removable hard disk drive memory have been described in connection with various computing devices, the underlying concepts can be applied to any computing device or system capable of handheld gaming with a handheld gaming device comprising a hard disk drive memory. The various techniques described herein can be implemented in connection with hardware or software or, where appropriate, with a combination of both. Thus, the methods and apparatus for gaming with a handheld gaming device comprising a hard disk drive memory, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for gaming with a handheld gaming device comprising a hard disk drive memory.

In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. The methods and apparatuses for a handheld gaming device comprising a hard disk drive memory also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of a handheld gaming device comprising a hard disk drive memory. Additionally, any storage techniques used in connection with a handheld gaming device comprising a hard disk drive memory can invariably be a combination of hardware and software. While a handheld gaming device comprising a hard disk drive memory has been described in connection with the exemplary embodiments of the various figures, it is to be understood that other similar embodiments can be used or modifications and additions can be made to the described embodiments for performing the same functions of multi-component gaming without deviating therefrom. Therefore, a handheld gaming device comprising a hard disk drive memory as described herein should not be limited to any single embodiment, but rather should be construed in breadth and scope in accordance with the appended claims.

What is claimed:

1. A handheld gaming device comprising:
   a display;
   a processor coupled to the display;
   a hard disk drive memory coupled to the processor, the hard disk drive being divided into a first portion, a second portion, and a third portion; and
   a second memory coupled to the processor, the second memory comprising executable instructions that when executed by the processor cause the processor to effectuate operations of a handheld gaming device as well as non-game related functions, comprising:
      executing a first access policy that restricts access to the first portion of the hard disk drive memory to data associated with a gaming application executable on the handheld gaming device;
      executing a second access policy that restricts access to the second portion of the hard disk drive memory to data associated with state and configuration information; and
      executing a third access policy that restricts access to the third portion of the hard disk drive memory to data associated with non-game related information comprising at least one of calendar information, a personal appointment, an address, an instant message, or an email message.

2. The gaming device of claim 1, the operations further comprising using application program interface (API) calls to access the second portion.

3. The gaming device of claim 1, wherein:
the hard disk drive memory comprises at least one of a 0.85 inch hard disk drive, a 1 inch hard disk drive, a 1.8 inch hard disk drive, a 2.5 inch hard disk drive, or a 3.5 inch hard disk drive; and
at least a portion of a game application is downloadable to the hard disk drive memory from at least one of a disc, a network, or a Universal Serial Bus compatible port.

4. The gaming device of claim 1, the operations further comprising:
receiving streaming data from a remote storage device; and
buffering the streaming data in the hard disk drive.

5. The handheld gaming device of claim 1, wherein:
the first portion and the second portion represent logical segregations of the hard disk drive memory and the logical segregations are maintained and supported by at least one handheld application executed on the handheld gaming device.

6. The handheld gaming device of claim 1, wherein the first, second, and third portions of the hard disk drive memory have memory boundaries that are not fixed whereby data associated with a gaming application and data associated with non-game related information are stored in a single portion of the hard disk drive memory.

7. A method comprising:
a processor executing executable instructions that when executed by the processor cause the processor to effectuate operations of a handheld gaming device as well as non-game related functions;
executing a first access policy that restricts access to a first portion of a hard disk drive memory located in a handheld gaming device comprising a display to data associated with a gaming application executable on the handheld gaming device;
executing a second access policy that restricts access to a second portion of the hard disk drive memory to data associated with state and configuration information; and
executing a third access policy that restricts access to a third portion of the hard disk drive memory to data associated with non-game related information comprising at least one of calendar information, a personal appointment, an address, an instant message, or an email message.

8. The method of claim 7, wherein said hard disk drive memory comprises a non-removable hard disk drive.

9. The method of claim 7, wherein:
the hard disk drive memory comprises at least one of a 0.85 inch hard disk drive, a 1 inch hard disk drive, a 1.8 inch hard disk drive, a 2.5 inch hard disk drive, or a 3.5 inch hard disk drive; and
at least a portion of a game is downloadable to the hard disk drive memory from at least one of a disc, a network, or a Universal Serial Bus compatible port.

10. The method of claim 7, further comprising utilizing the hard disk drive memory of the handheld gaming device as a buffer for streaming data.

11. The method of claim 7, wherein:
the first portion and the second portion represent logical segregations of the hard disk drive memory and the logical segregations are maintained and supported by at least one handheld application executed on the handheld gaming device.

12. The method of claim 7, wherein the first, second, and third portions of the hard disk drive memory have memory boundaries that are not fixed, further comprising storing data associated with a gaming application and data associated with non-game related information in a single portion of the hard disk drive memory.

13. A system comprising:
a handheld gaming device comprising a display and a hard disk drive memory having a first portion, a second portion, and a third portion; and
a processor in communication with the hard disk drive memory, the processor configured to:
execute executable instructions that when executed by the processor cause the processor to effectuate operations of a handheld gaming device as well as non-game related functions;
execute a first access policy that restricts access to the first portion of the hard disk drive memory to data associated with a gaming application executable on the handheld gaming device;
execute a second access policy that restricts access to the second portion of the hard disk drive memory to data associated with state and configuration information; and
execute a third access policy that restricts access to the third portion of the hard disk drive memory to data associated with non-game related information comprising at least one of calendar information, a personal appointment, an address, an instant message, or an email message.

14. The system of claim 13, the operations further comprising utilizing the hard disk drive memory as a buffer for streaming data.

15. The system of claim 13, wherein:
the hard disk drive memory comprises a non-removable hard disk drive;
the hard disk drive memory comprises at least one of a 0.85 inch hard disk drive, a 1 inch hard disk drive, a 1.8 inch hard disk drive, a 2.5 inch hard disk drive, or a 3.5 inch hard disk drive; and
at least a portion of a game is downloadable to the hard disk drive memory from at least one of a disc, a network, or a Universal Serial Bus compatible port.

16. The system of claim 13, wherein:
the first portion and the second portion represent logical segregations of the hard disk drive memory and the logical segregations are maintained and supported by at least one handheld application executed on the handheld gaming device.

17. The system of claim 13, wherein the first, second, and third portions of the hard disk drive memory have memory boundaries that are not fixed whereby data associated with a gaming application and data associated with non-game related information are stored in a single portion of the hard disk drive memory.

\* \* \* \* \*